United States Patent [19]
Albal et al.

[11] Patent Number: 5,268,160
[45] Date of Patent: Dec. 7, 1993

[54] PURIFICATION OF HYDROGEN PEROXIDE

[75] Inventors: Rajendra S. Albal; Robert N. Cochran, both of West Chester, Pa.

[73] Assignee: Arco Chemical Technology, L.P., Wilmington, Del.

[21] Appl. No.: 905,961

[22] Filed: Jun. 29, 1992

[51] Int. Cl.$^5$ ............................................. C01B 15/01
[52] U.S. Cl. ...................................... 423/584; 423/591
[58] Field of Search ............................... 423/584, 591

[56] References Cited

U.S. PATENT DOCUMENTS

| | | | |
|---|---|---|---|
| 2,819,949 | 1/1958 | Keeler et al. | 23/207 |
| 2,869,989 | 1/1959 | Keeler et al. | 23/207 |
| 2,871,102 | 1/1959 | Rust et al. | 23/207 |
| 2,871,103 | 1/1959 | Skinner et al. | 23/207 |
| 2,871,104 | 1/1959 | Rust | 23/207 |
| 2,949,343 | 8/1960 | Hood et al. | 23/207 |
| 3,003,853 | 10/1961 | Mecorney et al. | 23/207 |
| 3,012,860 | 12/1961 | Meeker et al. | 23/207 |
| 3,074,782 | 1/1963 | Meeker et al. | 23/207 |
| 3,294,488 | 12/1966 | Dunlop et al. | 423/584 |
| 3,351,635 | 11/1967 | Kollar | 260/348.5 |
| 3,556,727 | 1/1971 | Thirion | 423/584 |
| 4,303,632 | 12/1981 | Gosser | 423/591 |
| 4,792,403 | 12/1988 | Togo et al. | 423/584 |
| 4,897,085 | 1/1990 | Cochran et al. | 23/293 |
| 4,897,252 | 1/1990 | Cochran et al. | 423/591 |
| 4,999,179 | 3/1991 | Sugihara et al. | 423/584 |

*Primary Examiner*—Wayne Langel
*Attorney, Agent, or Firm*—William C. Long

[57] ABSTRACT

A process is provided whereby hydrogen peroxide containing various organic impurities is purified by contact with an organic nonionic hydrophobic polymeric adsorbent, preferably derived from polymerized styrene.

1 Claim, No Drawings

PURIFICATION OF HYDROGEN PEROXIDE

BACKGROUND OF THE INVENTION

1. Field of the Invention

The present invention relates to the purification of hydrogen peroxide, such as that prepared by oxidation of methyl benzyl alcohol, by adsorptive treatment with polymeric adsorbents.

2. Description of the Prior Art

Hydrogen peroxide is an important chemical of commerce which is produced in very large quantities for use in a number of industrial applications. The predominant process used commercially for the production of hydrogen peroxide involves the oxidation of anthrahydroquinone, extraction of hydrogen peroxide and reduction of the resulting anthraquinone to anthrahydroquinone which is reused. This process requires very high capital expenditures in that use of a working solvent with efficient recycle of various process components is a necessity Substantial efforts have been directed to processes which involve direct combination of hydrogen and oxygen but thus far such processes have not found widespread success.

Hydrogen peroxide has been formed by the oxidation of secondary alcohols At one time the production of hydrogen peroxide by oxidation of isopropanol was practiced commercially. Other secondary alcohols which have been mentioned as starting materials for hydrogen peroxide production include 1-phenyl ethanol (methyl benzyl alcohol) and cyclohexanol. See, for example, U.S. Pat. Nos. 2,871,102–4 of Shell Development. In such prior procedures, difficulties have been encountered in the separation and recovery of product hydrogen peroxide from the secondary alcohol oxidate mixtures. See, for example, Shell U.S. Pat. Nos. 2,819,949, 2,869,989, 2,949,343, 3,003,853, 3,012,860 and 3,074,782.

Hydrogen peroxide has also been formed by oxidation of very high boiling secondary alcohols such as diaryl methanol, the product hydrogen peroxide being stripped from the reaction mixture during oxidation; see U.S. Pat. No. 4,303,632.

In certain commercial technologies, there are produced substantial quantities of various secondary alcohols. For example, in the coproduction of propylene oxide and styrene monomer by the reaction of ethyl benzene hydroperoxide with propylene, methyl benzyl alcohol is formed and ultimately converted by dehydration to styrene monomer. See U.S. Pat. No. 3,351,635.

In U.S. Pat. No. 4,897,252, a process is described for the production of hydrogen peroxide by oxidation of methyl benzyl alcohol containing streams, such as those formed in the Oxirane process.

In U.S. Pat. No. 4,897,252, a process for the recovery of hydrogen peroxide from methyl benzyl alcohol oxidation mixtures by ethyl benzene extraction is described. The present invention provides a further improvement in this process.

SUMMARY OF THE INVENTION

In the process of U.S. Pat. No. 4,897,085 and of copending application Ser. No. 07/905,979, now U.S. Pat. No. 5,194,067, there are provided improved processes for the recovery of hydrogen peroxide from methyl benzyl alcohol oxidate involving the use of ethyl benzene as an extractive solvent. Efficient separation is achieved, and the process is especially advantageous in that only materials normally found in the commercial propylene oxide/styrene monomer process are employed in the separation and recovery. A problem with these processes is, however, the fact that the separated hydrogen peroxide is contaminated with small but troublesome amounts of organic impurities. In accordance with the present invention, such organic impurities are removed from the hydrogen peroxide by adsorption on an organic resin adsorbent.

DETAILED DESCRIPTION OF THE INVENTION

In accordance with the present invention, organic impurities normally associated with hydrogen peroxide produced by methyl benzyl alcohol oxidation including methyl benzyl alcohol, acetophenone, ethyl benzene, ethyl benzene hydroperoxide, benzoic acid, phenol, benzaldehyde and heavy organic materials are separated from hydrogen peroxide by adsorption on a non-ionic hydrophobic polymeric adsorbent. Lighter impurities such as formic acid, acetic acid and methyl hydroperoxide are not separated by this treatment but can readily be separated by distillation.

The invention is especially applicable to hydrogen peroxide prepared by the process of U.S. Pat. No. 4,897,252 and by the process of copending application Ser. No. 07/905,979, now U.S. Pat. No. 5,194,067, the disclosures of which are incorporated herein by reference. It has been found that hydrogen peroxide which is contaminated with impurities of the above type can be contacted in the liquid phase with the hydrophobic polymeric adsorbents whereby the impurities remain adsorbed on the polymeric adsorbent and hydrogen peroxide significantly reduced in impurities is readily separated. Relatively normal conditions of atmospheric pressure and ambient temperature can be used, although these conditions can be varied quite widely without affecting the efficiencies of separation.

The organic nonionic hydrophobic polymeric adsorbents which are employed in practice of the present invention are commercial articles of commerce usually representing a cross-linked polystyrene type polymer. Suitable materials are sold by Rohm and Haas under the trade names Amberlite® XAD-4 and Amberlite® XAD-16. These adsorbents are nonionic hydrophobic cross-linked polystyrene-based polymeric materials having macroreticular structure and high surface area which is largely aromatic in nature.

Amberlite® XAD 16 is a non-ionic hydropholic cross-linked polystyrene copolymer having a macroreticular structure, generally provided in the form of spherical beads. Typical properties include a moisture retention capacity of 64 to 68%, specific gravity of 1.06, surface area of 750 m$^2$/g minimum porosity of 0.58 to 0.63 ml. pore/ml. of bead.

Amberlite® XAD-4 is a cross-linked polystyrene-type polymer having a macroreticular structure generally provided as beads and having as typical properties a porosity of 0.5 ml. pore/ml. of bead, a surface area of about 800 m$^2$/g, and an average pore diameter of 40–60 A.

In practice of the present invention, the contaminated hydrogen peroxide in the liquid phase is contacted with the solid organic adsorbent, for example in packed bed type operation, and hydrogen peroxide reduced in impurities content is conveniently separated therefrom.

When the adsorptive capacity of the organic resin adsorbent has been reduced to a predetermined level, the resin can be regenerated by a methanol wash. Results have indicated that the resin is stable over extended periods of time and may be regenerated without significant loss in activity.

Hydrogen peroxide which is treated in accordance with the present invention generally contains one or more of methyl benzyl alcohol, acetophenone, phenol, ethyl benzene, ethyl benzene hydroperoxide, benzoic acid, benzaldehyde, formic acid, acetic acid, other acids higher in molecular weight than benzoic acid, heavy organics such as ethers having more than 200 mol. wt., methyl hydroperoxide and the like, each in amount of about 10–1000 ppm. Substantially complete removal of these impurities except formic acid, acetic acid and methyl hydroperoxide from the hydrogen peroxide can be achieved through practice of the present invention. The practice of the invention has important consequences in that during subsequent treatment procedures the formation of potentially hazardous mixtures of hydrogen peroxide and organic materials which might otherwise occur during hydrogen peroxide concentration can be substantially avoided.

The following example illustrates the invention

EXAMPLE

An aqueous hydrogen peroxide stream containing 22 wt. % $H_2O_2$ from the water and ethyl benzene extraction of methyl benzyl alcohol oxidate was treated in accordance with the invention. The stream contained 100–200 ppm methyl benzyl alcohol, 100–200 ppm acetophenone, 40–80 ppm ethyl benzene, 50–100 ppm methyl hydroperoxide, 20–40 ppm ethyl benzene hydroperoxide, 500–600 ppm benzoic acid, 500–600 ppm formic acid, 10–40 ppm acetic acid, 100–200 ppm acids heavier than benzoic acid, 50–70 ppm phenol, 30–40 ppm benzaldehyde and 500–700 ppm heavy organics which have a molecular weight more than 200 such as methyl benzyl alcohol ethers.

The contaminated hydrogen peroxide solution was passed in the liquid phase at room temperature through a bed of Amberlite ® XAD-16 resin at the rate of 0.5 gpm/ft$^3$ of resin and recovered solution was found to contain only 500–600 ppm of formic acid, 10–40 ppm of acetic acid and 50–100 ppm of methyl hydroperoxide of the above impurities. Breakthrough of impurities did not occur until about 30–40 volumes of feed had been treated per volume of resin. Phenol was the first impurity to appear. The resin was regenerated by washing with 2–3 volumes of methanol per volume of resin at room temperature at a wash rate of 1.0 gpm/ft$^3$ of resin whereby the adsorptive capacity of the resin was substantially completely restored.

No significant decline in impurities removal was evident after repeated cycles.

I claim:

1. The method of removing organic impurities from hydrogen peroxide prepared by oxidation of methyl benzyl alcohol and containing 10–1000 ppm of each of one or more organic impurities selected from the group consisting of methyl benzyl alcohol, acetophenone, phenol, ethyl benzene, ethyl benzene hydroperoxide, benzoic acid, benzaldehyde, acids heavier than benzoic acid and heavy organic materials having a molecular weight of more than 200 which comprises contacting hydrogen peroxide containing said one or more organic impurities in the liquid phase with an organic nonionic hydrophobic polymeric adsorbent consisting of a cross-linked polystyrene resin having a macroreticular structure, and separating hydrogen peroxide having a reduced content of said one or more organic impurities.

* * * * *